United States Patent
Lee et al.

(10) Patent No.: US 6,970,463 B2
(45) Date of Patent: Nov. 29, 2005

(54) APPARATUS FOR ESTABLISHING PATH IN SYNCHRONOUS DIGITAL HIERARCHY SYSTEM AND METHOD THEREOF

(75) Inventors: Won Hee Lee, Seoul (KR); Dong Min Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 939 days.

(21) Appl. No.: 09/948,585

(22) Filed: Sep. 10, 2001

(65) Prior Publication Data

US 2002/0075908 A1 Jun. 20, 2002

(30) Foreign Application Priority Data

Oct. 31, 2000 (KR) .......................................... 2000-64134

(51) Int. Cl.[7] .............................................. H04L 12/28
(52) U.S. Cl. .................. 370/392; 370/395.51; 370/539; 370/541
(58) Field of Search ................................. 370/437, 468, 370/535, 539, 541, 392, 395.51

(56) References Cited

U.S. PATENT DOCUMENTS

| | | | | | |
|---|---|---|---|---|---|
| 5,335,223 | A | * | 8/1994 | Iino | 370/503 |
| 5,790,557 | A | * | 8/1998 | Lee et al. | 370/535 |
| 6,011,802 | A | * | 1/2000 | Norman | 370/466 |
| 6,240,106 | B1 | * | 5/2001 | Slater | 370/517 |
| 6,603,776 | B1 | * | 8/2003 | Fedders et al. | 370/476 |
| 6,667,989 | B1 | * | 12/2003 | Sekii et al. | 370/465 |
| 6,765,933 | B1 | * | 7/2004 | Michel et al. | 370/539 |
| 6,870,829 | B1 | * | 3/2005 | Goodman | 370/352 |
| 6,891,862 | B1 | * | 5/2005 | Brady et al. | 370/539 |

* cited by examiner

*Primary Examiner*—Ricky Ngo
*Assistant Examiner*—Nguyen H. Ngo
(74) *Attorney, Agent, or Firm*—Fleshner & Kim, LLP

(57) ABSTRACT

Disclosed is an apparatus for establishing a path in a synchronous digital hierarchy (SDH) system and method thereof. The present invention monitors all possible locations for the existence of the C2 byte of the VC-n (n=3,4) signal and a size bit (SS bit) of the TU-m (m=11,12,2,3) signal, thereby enabling it to decide the pointer interpretation and generation path automatically.

19 Claims, 3 Drawing Sheets

APPARATUS FOR ESTABLISHING PATH IN SYNCHRONOUS DIGITAL HIERARCHY SYSTEM AND METHOD THEREOF

BACKGROUND OF THE INVENTION

1. Field of the Invention

The present invention relates to an apparatus and a method for establishing an information path, and more particularly, in a synchronous digital hierarchy (SDH) system.

2. Background of the Related Art

Generally, a synchronous digital hierarchy (hereinafter abbreviated SDH) system in accordance with the ITU-T suggestion produces synchronous transfer module (STM) n rank signal by processing DS-1, DS-2, and DS-3 rank signals in a T1 signal system or DS-1E, DS-2E, DS-3E, and DS-4E rank signals in an E1 signal system according to a predetermined hierarchy.

In order to transfer a predetermined asynchronous signal through the SDH system, a series of procedures for converting the corresponding asynchronous signal into an STM-n signal of a synchronous transfer module have to be carried out. Namely, the SDH system accommodates an asynchronous DS rank signal of the T1 or E1 system in a container, forms a virtual container (VC) by attaching a path overhead (POH) to the corresponding container, forms a tributary unit (TU) signal by attaching a pointer byte and a justification bit to the virtual container (VC), and forms a tributary unit group (TUG) signal by multiplexing the TU signal. Then, an administration unit group (AUG) and an STM-n signal are formed successively by carrying out additional processing on the TUG signal.

The present invention relates to realizing a TU-m pointer-processor application specific integrated circuit (ASIC) that processes the TU-m (m=11, 12, 2, 3) rank signals as the TU signals, which is compared to the following related art.

When interpreting and producing a TU-m rank pointer, a multiplexing path of an AUG signal of the AUG is selected by a setup of a microprocessor. Processing of the TU-m rank pointer is carried out along the selected path.

FIG. 1 illustrates a path for a general TU-m rank pointer processing. An AUG signal is demultiplexed into AU-4 or AU-3 signal and then pointer-processed. Thereby, the AUG signal is aligned into a VC-4 or a VC-3 signal, respectively. The demultiplexing/multiplexing processing of the AU-4 signal is carried out along a path such as AU-4→VC-4→TUG-3→VC-3→TU-3→TUG-3 and the like, while demultiplexing/multiplexing processing of the AU-3 signal is carried out along a path such as AU-3→VC-3→TUG-2→TU-2(TU-11, TU-12)→VC-2(VC-11, VC-12)→TU-2 (TU-11, TU-12) →TUG-2 and the like. In this case, available paths for processing the respective signals are established variously.

An ASIC for carrying out pointer processing along such paths includes a pointer interpretation unit interpreting a pointer, a pointer generation unit producing the pointer, and a microprocessor interface monitoring and controlling the pointer interpretation and generation. Such a construction of an ASIC is well-known in the art and its description will be skipped.

An operator determines a path for the pointer processing in the related art. Namely, the operator, selects a path for processing a pointer in a plurality of paths and then establishes the microprocessor construction for the selected path.

As a result, a multiplexing path of the AUG signal of the administration unit group is selected by the selection of the microprocessor construction, whereby the interpretation and generation of the TU-m rank pointer is achieved along the selected path.

As the multiplexing construction of the conventional AUG signal is achieved by the constructional establishment of the microprocessor, path establishment by the operator should precede the established construction. Therefore, the operator has to select a pointer processing path for interpretation and generation of the TU-m rank pointer by himself in the related art. Specifically, system operational efficiency is reduced since the operator does the path establishment.

Besides, a multiplexing/demultiplexing path for pointer processing, as shown in FIG. 1, is constructed as a mirror image, for instance, centering around VC-C. Therefore, when the operator selects a path to be processed and establishes a microprocessor construction to fit the selected path, unnecessary software has to be added to the same path.

The above reference is incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to an apparatus for establishing a path in a synchronous digital hierarchy (SDH) system and method thereof that substantially obviates one or more problems, limitations, and disadvantages of the related art.

An object of the present invention is to provide an apparatus for establishing a path in a synchronous digital hierarchy (SDH) system and method thereof enabling the automatic establishment of a processing path of a TU signal when interpreting and generating a TU-m rank pointer.

To achieve these objects and other advantages and in accordance with the purpose of the invention, as embodied and broadly described herein, an apparatus for establishing a path in a synchronous digital hierarchy system according to the present invention includes a demultiplexing path establishment means for demultiplexing an AU-n (n=3, 4) signal into a TU-m (m=11, 12, 2, 3) signal and deciding a payload type and a pointer processing path based on a signal level and size of the demultiplexed TU-m signal, and a pointer processor multiplexing the TU-m signal into the AU-n signal by producing a pointer equivalent to a demultiplexing path by detecting automatically the demultiplexing path established by the demultiplexing path establishment means.

In another aspect of the present invention, an apparatus for establishing a path in a synchronous digital hierarchy system includes a path decision unit aligning an AU-n (n=3, 4) signal into a VC-n signal, a byte detection unit detecting a C2 byte representing a signal level from the aligned VC-n signal, a demultiplexing unit demultiplexing the aligned VC-n signal into a TU-m (m=11, 12, 2, 3) signal, a bit detection unit detecting SS bit(s) representing a size of the TU-m signal outputted from the demultiplexing unit, a payload type/path decision unit determining a payload type and a pointer processing path using the C2 byte and SS bit(s), and a pointer processor multiplexing the demultiplexed TU-m signal into the AU-n signal by interpreting and producing a pointer in accordance with the decided payload type and pointer processing path.

In a further aspect of the present invention, a method of establishing a path in a synchronous digital hierarchy system includes the steps of aligning an AU-n (n=3, 4) signal to a VC-n signal, demultiplexing the aligned AU-n signal into a TU-m (m=11, 12, 2, 3) signal and deciding a payload type and a pointer processing path based on a C2 byte and an SS bit of the demultiplexed TU-m signal, and multiplexing the TU-m signal into the AU-n signal by interpreting and producing a pointer in accordance with the decided payload type and pointer processing path.

The object of the present invention may be achieved in whole or in part by an apparatus for establishing an information path, including a demultiplexer that demultiplexes a VC-n signal into a TU-m signal and identifies a size of the TU-m signal; a signal interpreter that determines a payload type of the VC-n signal based on overhead information of the VC-n signal; and a payload path decision means for determining a payload processing path for the TU-m signal based on the size of the TU-m signal and the payload type of the VC-n signal.

The objects of the present invention may be further achieved in whole or in part by a method for establishing an information path, including demultiplexing a VC-n signal into a TU-m signal and identifying a size of the TU-m signal; determining a payload type of the VC-n signal based on overhead information of the VC-n signal; and determining a payload processing path for the TU-m signal based on the size of the TU-m signal and the payload type of the VC-n signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

A preferred embodiment of the present invention, which is applied to the design and operation of an ASIC realizing a TU-m (m=11, 12, 2, 3) pointer-processing microprocessor, is characterized in that a path for pointer processing is automatically selected in accordance with a C2 byte representing a signal level of a demultiplexed TU-m signal and a value of SS bit(s) representing a size of the signal.

Figure 2:
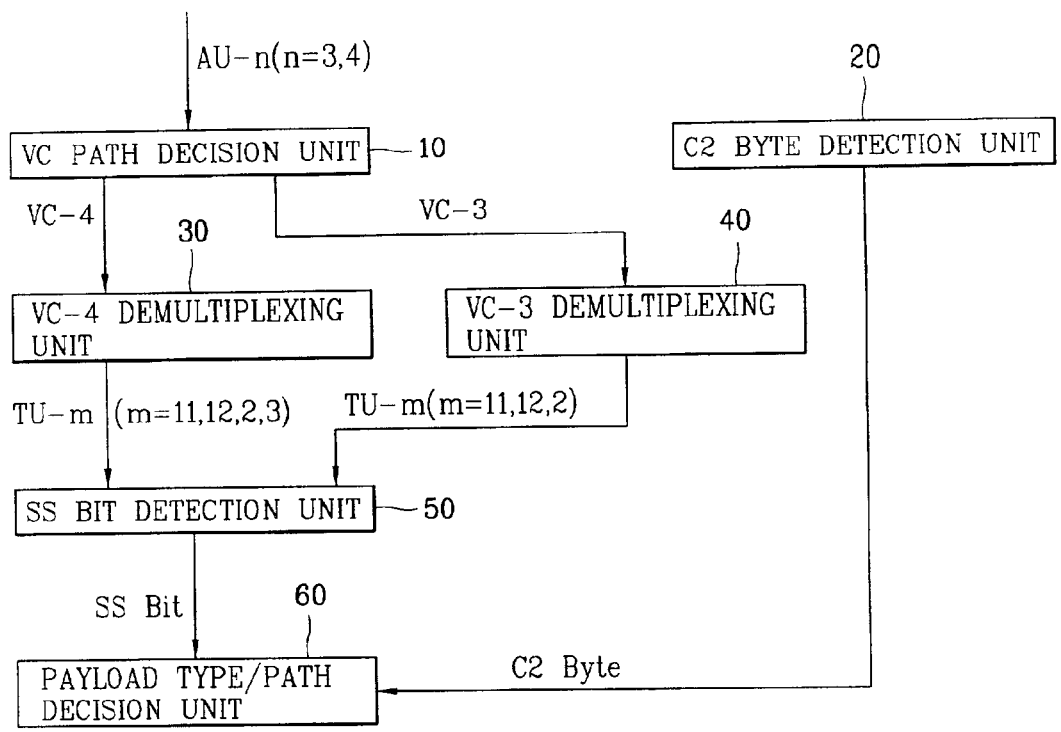
FIG. 2 illustrates a block diagram of an apparatus for establishing a path in an SDH system, according to a preferred embodiment of the present invention.

FIG. 2 illustrates a block diagram of an apparatus for establishing a path in an SDH system according to a preferred embodiment of the present invention. The apparatus is constructed with a VC path decision unit 10 that selects a VC-3 or VC-4 path by pointer-interpreting an AU-n (n=3, 4) signal, according to whether a concatenation indication (CONC) exists, a C2 byte detection unit 20 detecting a C2 byte representing a signal level, when a VC-n signal and a path overhead (POH) are detected; a VC-4 demultiplexing unit 30 demultiplexing a VC-4 signal selected by the VC path decision unit 10 into a TU-11/12/2/3 signal; a VC-3 demultiplexing unit 40 demultiplexing a VC-3 signal selected by the VC path decision unit 10 into a TU-11/12/2 signal; an SS bit detection unit 50 detecting SS bit(s) representing a size of a TU-m (m=11, 12, 2, 3) signal produced by the VC-4 or VC-3 demultiplexing unit 30 or 40; and a payload type/path decision unit 60 selecting a payload type and a pointer-processing path using the C2 byte and SS bit(s).

The operation of the apparatus is explained below. An AUG signal is separated into an AU-4 signal or an AU-3 signal by demultiplexing. The VC path decision unit 10 interprets a pointer of the separated AU-n (n=3, 4) signal and then aligns the AU-n signal into a VC-3 or VC-4 signal, according to whether a CONC exists or not. If a CONC exists, the AU-n signal is aligned to the VC-4 signal. Otherwise, the AU-n signal is aligned into the VC-3 signal.

Figure 1:
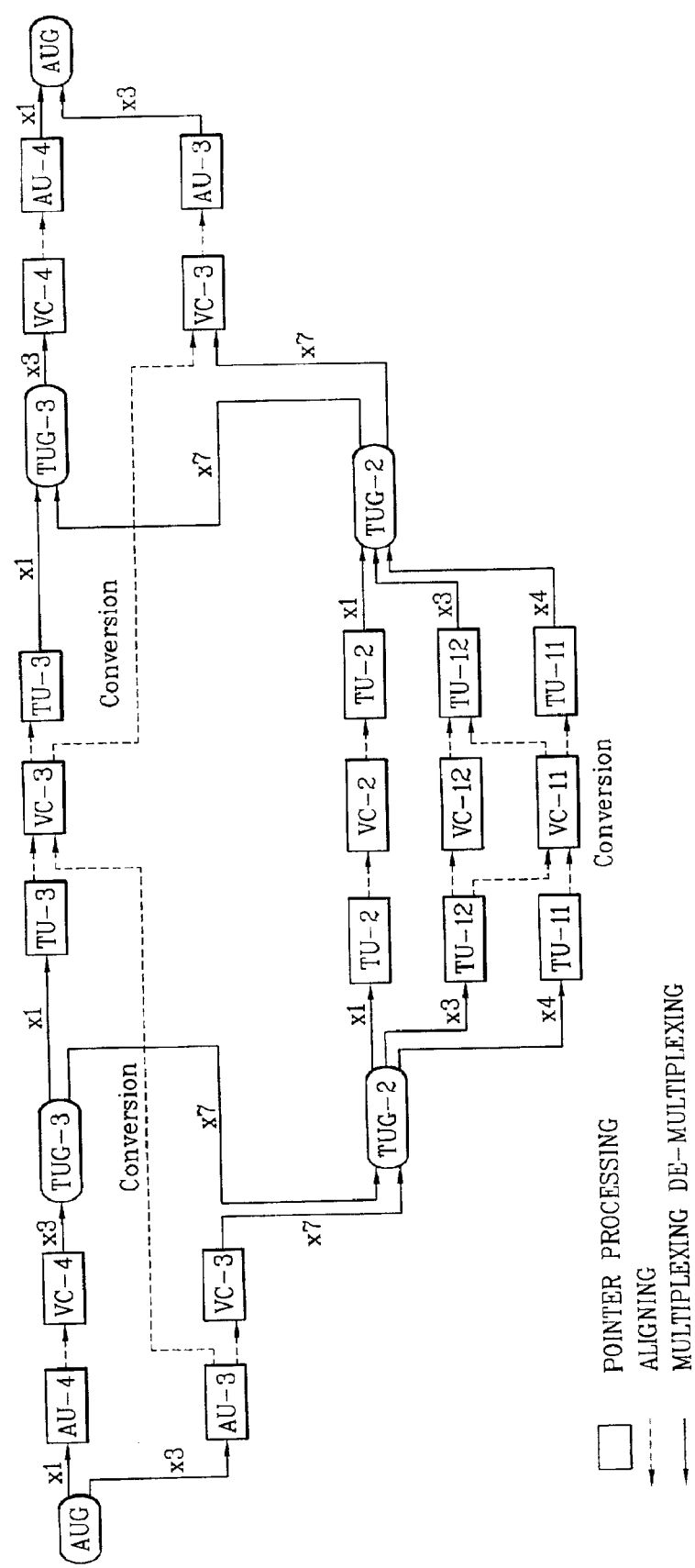
FIG. 1 illustrates a path for general TU-m rank pointer processing.

Once the VC-n (n=3, 4) signal is aligned, the C2 byte detection unit 20 accumulates and detects a path overhead (POH) of the corresponding VC-3 or VC-4 signal and detects a C2 byte representing a signal level identifying a T1/E1 system. Moreover, the VC-4 demultiplexing unit 30, when the VC-4 path is established, demultiplexes the VC-4 signal into the TU-11/12/2/3 path. IF the VC-3 path is established, the VC-3 demultiplexing unit 40 demultiplexes the VC-3 signal into the TU-11/12/2 path. In this case, the TU-11/12/2/3 and TU-11/12/2 paths may be recognized through the signal hierarchy system shown in FIG. 1.

Thereafter, the SS bit detection unit 50 detects the SS bits representing a size of the TU-m signal, if the TU-m (m=11, 12, 2, 3) signal is generated from the VC-4 or VC-3 demultiplexing unit 30 or 40, respectively. And, the payload type/path decision unit 60 decides a payload type and a processing path using the detected C2 byte and the SS bits values.

Therefore, the pointer processor (not shown in the drawing) interprets a pointer of the TU-m signal, after detecting the demultiplexing path automatically, and then stores the payload data of the TU-m signal in an elastic buffer (not shown in the drawing). Then, the pointer processor produces a pointer of the TU-m signal equivalent to the detected demultiplexing path, so as to multiplex the demultiplexed TU-m signal into an AU-n signal again.

Figure 3:
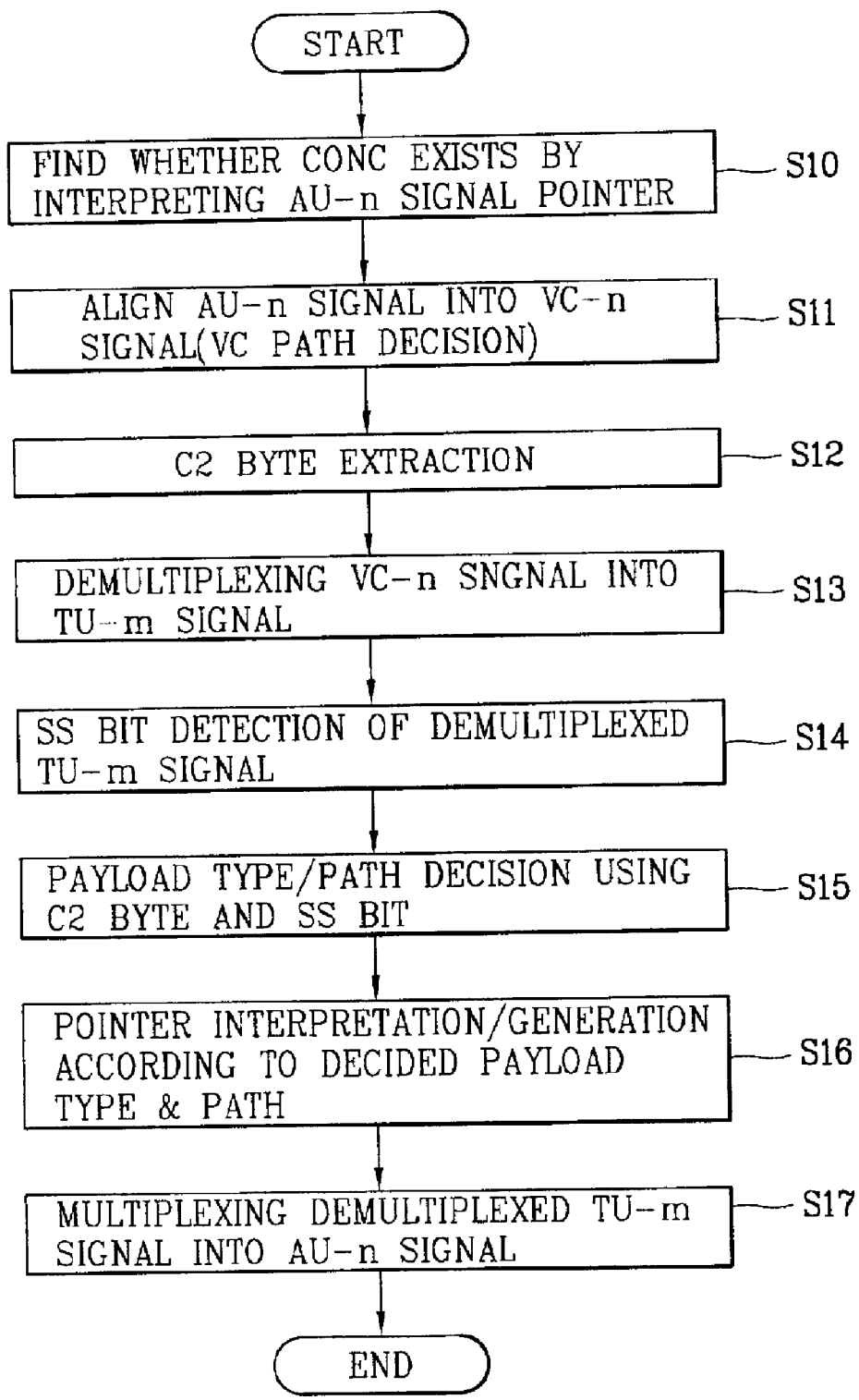
FIG. 3 illustrates a flowchart of a preferred method of establishing a path in an SDH system.

FIG. 3 illustrates a flowchart of a preferred method of establishing a path in an SDH system. The VC path decision unit 10 ascertains the existence of a CONC, by interpreting a pointer of the AU-n (n=3, 4) signal (S10), and establishes a VC path by aligning the AU-n signal into a VC-4 or VC-3 signal in accordance with the existence of the CONC (S11). If the CONC exists, the AU-n signal is aligned into the VC-4 signal. Otherwise, the AU-n signal is aligned into the VC-3 signal.

Once the VC path is established, the C2 byte detection of the VC-n signal and multiplexing of the VC-n signal are carried out (S12, S13). Specifically, the C2 byte detection unit 20 accumulates and extracts the path overhead (PO) of the VC-3 or VC-4 signal and detects the C2 byte representing the signal level (S12). The VC-4 demultiplexing unit 30 demultiplexes the VC-4 signal into the TU-11/12/2/3 path, if the path established by the VC path decision unit 10 is VC-4.

The VC-3 demultiplexing unit 40 demultiplexes the VC-3 signal into the TU-11/12/2 path, if the path established by the VC path decision unit 10 is VC-3.

After the TU-m signal is produced by demultiplexing the VC-4 or VC-3 signal, the SS bit detection unit 50 detects the SS bit(s) representing sizes of the respectively-produced TU-m signals(S14).

The payload type/path decision unit 60 decides the payload type and processing path by receiving the detected C2 byte and the SS bit(s) and then by comparing the received data to the table information shown in <Table 1>(S15). A count circuit monitors all possible locations for the existence of the C2 byte, of the VC-n signal, and the SS bit of the TU-m signal, thereby enabling it to decide the pointer interpretation and generation path automatically.

TABLE 1

| AU-n | C2 byte | SS bit | TU-m |
|---|---|---|---|
| AU-3 | hO2 | 11 | TU-11 |
|  |  | 10 | TU-12 |
|  |  | 00 | TU-2 |
| AU-4 | HO2 | 11 | TU-11 |
| CONC |  | 10 | TU-12 |
|  |  | 00 | TU-2 |
|  |  | 10 | TU-3 |

For example, when the C2 byte is "hO2" and the SS bit(s) are "11," the payload type/path decision unit 60 determines a payload type "hO2," a VL-3 path, and a processing path "TU-11." Such a series of decision systems are applied to all TU-m signals.

Therefore, the pointer processor interprets and produces the pointer in accordance with the identified processing path (S16), whereby the demultiplexed TU-n signal (S17).

Accordingly, the preferred embodiment of the invention tracks a multiplexing path automatically, when interpreting and producing a TU-m rank pointer, thereby enabling it to improve the system operation efficiency.

Moreover, the preferred embodiment of the invention tracks a multiplexing path automatically, when interpreting and producing a TU-m rank pointer, and produces a pointer equivalent to the tracked multiplexing path to carry out the demultiplexing, thereby enabling it to reduce the load on software.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for establishing an information path, comprising:
    a demultiplexing path establishment means for demultiplexing an AU-n (n=3, 4) signal into a TU-m (m=11, 12, 2, 3) signal and deciding a payload type and a pointer processing path based on a signal level and a size of the demultiplexed TU-m signal; and
    a pointer processor that multiplexes the TU-m signal into the AU-n signal by automatically detecting the pointer processing path established by the demultiplexing path establishment means and producing a pointer equivalent to the pointer processing path.

2. The apparatus of claim 1, wherein the demultiplexing path establishment means further comprises:
    a path decision unit that selects a VC path by interpreting a first pointer of the AU-n signal;
    a C2 byte detection unit that interprets a C2 byte representing the signal level from a VC-n signal of the VC path;
    a demultiplexing unit that demultiplexes the VC-n signal of the VC path into the TU-m signal;
    a bit detection unit that interprets a number of SS bits representing the size of the TU-m signal outputted from the demultiplexing unit; and
    a payload path decision unit that determines the payload type and the pointer processing path using the C2 byte and the number of SS bits.

3. The apparatus of claim 2, wherein the path decision unit determines a VC-4 path for the pointer processing path, by interpreting the first pointer of the AU-n signal, if a concatenation indication (CONC) exists, and a VC-3 path for the pointer processing path if the CONC fails to exist.

4. The apparatus of claim 2, wherein the demultiplexing unit further comprises:
    a VC-4 demultiplexing unit, when the VC path is VC-4, that demultiplexes a VC-4 signal of the VC-n signal into a TU-m path for a TU-11, TU-12, TU-2, or TU-3 signal of the TU-m signal; and
    a VC-3 demultiplexing unit, when the VC path is VC-3, that demultiplexes a VC-3 signal of the VC-n signal into the TU-m path for a TU-11, TU-12, or TU-2 signal of the TU-m signal.

5. An apparatus for establishing an information path, comprising:
    a path decision unit that aligns an AU-n (n=3, 4) signal into a VC-n signal;
    a byte detection unit that detects a C2 byte representing a signal level from the aligned VC-n signal;
    a demultiplexing unit that demultiplexes the aligned VC-n signal into a TU-m (m=11, 12, 2, 3) signal;
    a bit detection unit that detects a number of SS bits representing a size of the TU-m signal, outputted from the demultiplexing unit;
    a payload path decision unit that determines a payload type and a pointer processing path using the C2 byte and the number of SS bits; and
    a pointer processor that multiplexes the demultiplexed TU-m signal into the AU-n signal by interpreting and producing a first pointer in accordance with the payload type and the pointer processing path.

6. The apparatus of claim 5, wherein the path decision unit aligns the AU-n signal to a VC-4 signal of the VC-n signal, by interpreting a second pointer of the AU-n signal, if a concatenation indication (CONC) exists, and a VC-3 signal of the VC-n signal if the CONC fails to exist.

7. The apparatus of claim 5, wherein the demultiplexing unit further comprises:
    a VC-4 demultiplexing unit, when an established path is for a VC-4 signal of the VC-n signal, that demultiplexes the VC-4 signal into a TU-m path for a TU-11, TU-12, TU-2, or TU-3 signal of the TU-m signal; and
    a VC-3 demultiplexing unit, when the established path is for a VC-3 signal of the VC-n signal, that demultiplexes the VC-3 signal into the TU-m path for a TU-11, TU-12, or TU-2 signal of the TU-m signal.

8. A method of establishing an information path, comprising:

aligning an AU-n (n=3, 4) signal to a VC-n signal;

demultiplexing the aligned VC-n signal into a TU-m (m=11, 12, 2, 3) signal and deciding a payload type and a pointer processing path based on a C2 byte and an SS indicator of the demultiplexed TU-m signal; and multiplexing the TU-m signal into the AU-n signal by interpreting and producing a first pointer in accordance with the decided payload type and the pointer processing path.

9. The method of claim 8, wherein aligning the AU-n (n=3, 4) signal to the VC-n signal is carried out by interpreting a second pointer of the AU-n signal, so as to align the AU-n signal to a VC-4 signal of the VC-n signal if a concatenation indication (CONC) exists and a VC-3 signal of the VC-n signal if the CONC fails to exist.

10. The method of claim 8, wherein deciding the payload type and the pointer processing path further comprises:

detecting the C2 byte representing a signal level from the aligned VC-n signal;

demultiplexing the aligned VC-n signal into the TU-m signal;

detecting the SS indicator representing a size of the demultiplexed TU-m signal; and determining the payload type and the pointer processing path using the C2 byte and the SS indicator.

11. An apparatus for establishing an information path, comprising:

a demultiplexer that demultiplexes a VC-n signal into a TU-m signal and identifies a size of the TU-m signal;

a signal interpreter that determines a payload type of the VC-n signal based on overhead information of the VC-n signal; and a payload path decision means for determining a payload processing path for the TU-m signal based on the size of the TU-m signal and the payload type of the VC-n signal.

12. The apparatus of claim 11, further comprising a first pointer processor that determines whether a concatenation indication exists in a first pointer of an AU-n signal, the first pointer processing means aligning the AU-n signal along a VC-4 path if the concatenation indication exists and along a VC-3 path if the concatenation indication does not exist.

13. The apparatus of claim 12, wherein:

the demultiplexer demultiplexes a VC-4 type signal of the VC-n signal into the TU-m signal on the VC-4 path; and the demultiplexer demultiplexes a VC-3 type signal of the VC-n signal into the TU-m signal on the VC-3 path.

14. The apparatus of claim 13, wherein:

the payload processing path and the size determine the payload processing path selected from the group of a TU-11 signal path, a TU-12 signal path, and a TU-2 signal path, if the AU-n signal is aligned along the VC-3 path; and the payload processing path and the size determine the payload processing path selected from the group of the TU-11 signal path, the TU-12 signal path, the TU-2 signal path, and a TU-3 signal path, if the AU-n signal is aligned along the VC-4 path.

15. The apparatus of claim 11, further comprising a multiplexer that multiplexes the TU-m signal into the VC-n signal, according to the determined payload processing path.

16. The apparatus of claim 12, further comprising:

a multiplexing means for multiplexing the TU-m signal into the AU-n signal, according to the determined payload processing path.

17. The apparatus of claim 16, further comprising:

the apparatus automatically establishes the payload processing path in a synchronous digital hierarchy system for the communication of an asynchronous signal.

18. The apparatus of claim 12, further comprising:

a first processing means for processing the TU-m signal according to the determined payload processing path; and a multiplexing means for multiplexing the TU-m signal into the AU-n signal, the multiplexing means having a second processing means for processing the TU-m signal in a corresponding manner to the first processing means, as determined by the payload processing path.

19. A method for establishing an information path, comprising:

demultiplexing a VC-n signal into a TU-m signal and identifying a size of the TU-m signal;

determining a payload type of the VC-n signal based on overhead information of the VC-n signal; and determining a payload processing path for the TU-m signal based on the size of the TU-m signal and the payload type of the VC-n signal.

* * * * *